July 1, 1947.  L. LEE, 2D  2,423,394
DEVICE FOR MEASURING THE RATIO BETWEEN TWO VARIABLES
Filed Dec. 30, 1943
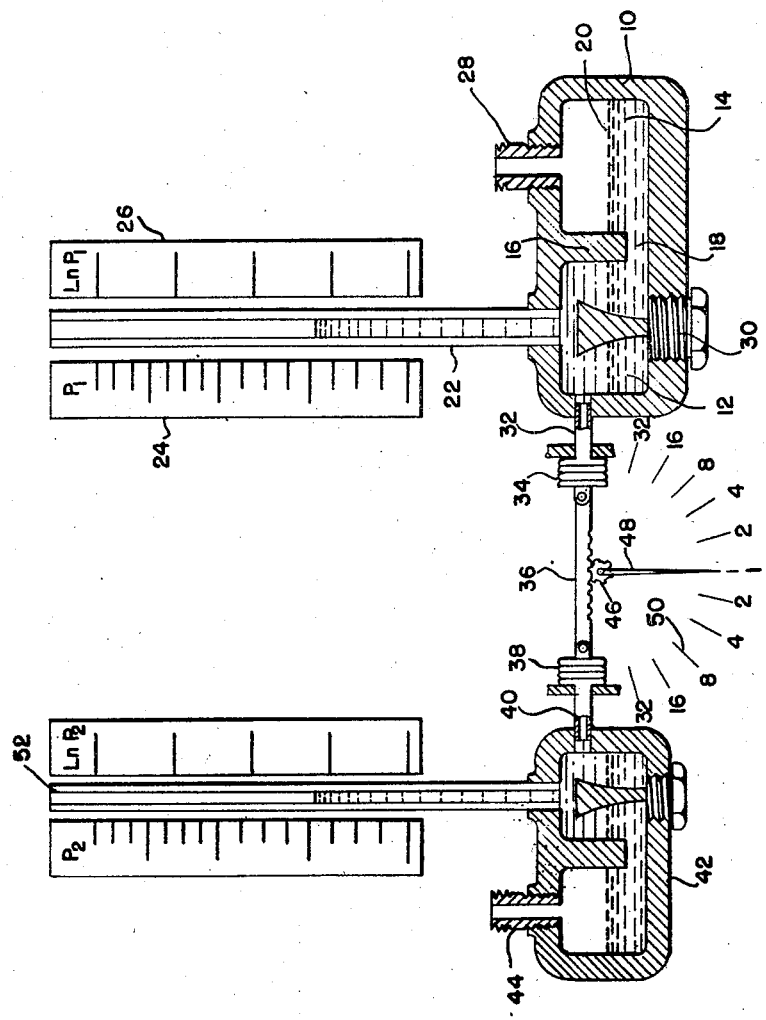
INVENTOR
*Leighton Lee II*
BY- *Lester W Clark*
AGENT Patented July 1, 1947

2,423,394

UNITED STATES PATENT OFFICE 2,423,394

DEVICE FOR MEASURING THE RATIO BETWEEN TWO VARIABLES

Leighton Lee, II, Meriden, Conn., assignor, by mesne assignments, to Niles-Bement-Pond Company, West Hartford, Conn., a corporation of New Jersey Application December 30, 1943, Serial No. 516,231

6 Claims. (Cl. 73—196)

The present invention relates to measuring apparatus, and particularly to apparatus for measuring the ratio between two variable conditions.

In the following specification, I have described improved apparatus for producing an indication which varies as a predetermined function of a variable condition. When employing the principles of my invention to measure the ratio of two conditions, I utilized two units each of which produces a pressure which varies as the logarithm of one of the two conditions whose ratio is to be measured. Suitable differential pressure responsive means is provided for measuring the difference of these two pressures, and the ratio of the two conditions is indicated by the differential pressure measuring apparatus on a scale calibrated in logarithmic units.

An object of the invention is to provide improved means for producing an indication varying as any predetermined function of a variable condition.

Another object is to provide improved means for producing an amplified indication of the variations of a variable condition.

Another object is to provide improved means for producing an indication varying as the logarithm of a variable condition.

A further object is to provide apparatus utilizing two units of the logarithmic indicating type to produce an indication of the ratio of two variable conditions.

Other objects and advantages of the present invention will become apparent from a consideration of the appended specification, claims and drawing, in which the single figure represents ratio measuring apparatus embodying the principles of my invention.

Referring to the drawing, there is shown a casing 10 divided into two chambers 12 and 14 by a transverse wall 16. The wall 16 is apertured near the bottom of the two chambers, as at 18, to provide a fluid communication therebetween. The chambers 12 and 14 are partially filled with a heavy fluid, such as mercury, the level of the mercury being indicated at 20. Above the level of the mercury, the chamber 12 is filled with a less dense fluid, for example, water or alcohol.

A transparent tube 22 is inserted thru an opening in the casing 10 into the upper part of chamber 12. The less dense fluid in chamber 12 extends upwardly into and partially fills the tube 22. A pair of scales 24 and 26 are provided adjacent the opposite sides of tube 22. The scale 24 is provided with logarithmically spaced divisions, which may be calibrated in terms of pressure. The scale 26 is provided with evenly spaced divisions, which may be calibrated in terms of the logarithms of the values indicated on the scale 24.

The chamber 14 is provided with a pressure connection 28, by means of which a variable pressure may be applied to the surface of the mercury 20.

A plug 30 is inserted thru the bottom of chamber 12, and extends upwardly into the chamber 12 and a substantial difference above the level of the mercury therein. The cross-sectional area of the plug 30 varies as a modified logarithmic function of the depth of the chamber 12.

It may be seen that a variation in the pressure applied to chamber 14 thru connection 28 causes a corresponding variation in the level of the mercury in the chamber 12. Because of the effect of the plug 30, this variation in the level in chamber 12 causes a variation in the volume of the less dense fluid contained therein, which latter variation is a modified function of the logarithm of the change in the mercury level. Any change in the volume of the less dense fluid in chamber 12 is accompanied by an equal and opposite change in the volume of the same fluid in tube 22. Since the tube 22 is of constant cross-section, the level of the fluid therein varies as a function of the logarithm of the pressure applied thru connection 28.

The pressure at the base of tube 22 varies as the height of the fluid in tube 22, and hence as the logarithm of the pressure applied thru the connection 28. This pressure is communicated thru a tube 32 to a bellows 34 acting on one end of a rack bar 36. The other end of rack bar 36 is positioned by a bellows 38 whose interior is connected by a tube 40 to a casing 42 containing a mechanism substantially identical with that in casing 10, and having a pressure connection 44 corresponding to pressure connection 28 of casing 10.

The rack bar 36 is provided with rack teeth on its lower surface, which cooperate with a pinion 46 to which is attached a pointer 48 moving across a logarithmic scale 50.

It may be seen that the position of rack bar 36, and hence of pointer 48, is determined by the difference between two pressures, each of which varies as the logarithm of the pressures applied thru the connections 28 and 44, respectively. The position of pointer 48 therefore varies with the logarithm of the ratio of those two pressures. Since the scale 50 is logarithmically calibrated, the position of pointer 48 on scale 50 indicates directly the ratio of the two pressures. If desired, suitable recording or regulating apparatus may be employed in place of the simple indicating pointer 48.

If the plug 30 were designed so that its cross-sectional area varied exactly as the logarithm of the depth of chamber 12, an error would be introduced due to the variation in pressure on the surface of the mercury in chamber 12 with the variation in the liquid level in the tube 22. The amount of this error is dependent upon the relative cross-sectional areas of the chamber 12 and tube 22, and also upon the relative densities of the two liquids employed. For any given liquids used, this error may be completely eliminated by proper design of the plug 30.

Another error which may be encountered is that due to the variations in volume of bellows 34. If this bellows is small as compared to the volume of chamber 12, this error will be negligible. Furthermore, it may also be at least partially compensated by proper design of the plug 30. Furthermore, some device having a negligible variation in volume with variations in pressure, as for example a Bourdon tube, may be used instead of the bellows.

Altho I have illustrated the effective cross-sectional area of chamber 12 as being varied by the use of a plug 30, it will be understood that it may be readily varied by other equivalent means, as for example by properly shaping the casing walls. Furthermore, instead of varying the effective cross-sectional area of the chamber 12, I may gain the same effect by varying the internal diameter of the tube 22 as a function of its height, or employ a suitable plug of variable cross-section in that tube.

It should be understood that my device is adaptable to many applications. For example, it may be used to measure the ratio of fuel to air supplied to an internal combustion engine. This ratio may be measured by producing one pressure differential proportional to the air flow and applying that pressure differential to the connection 28 and the tube 22 of the device shown in Figure 1. At the same time, a pressure differential proportional to fuel flow may be applied to the connection 44 and tube 52. These pressure differentials may be obtained by the use of Venturi restrictions, of any other suitable means of obtaining a pressure differential which varies as a function of fluid flow.

It should also be understood that this arrangement is not limited to the use of a plug which causes the indicating fluid level to vary as the logarithm of the applied pressure, but that other plugs may be used to cause the indication to vary with different functions of the applied pressure. Furthermore, the plug may be omitted and the device used to amplify linearly the variations of the applied pressure. Of course, the device may be used to measure variable conditions other than pressures. For example, it might be used to measure the angle of a tilted surface.

Altho I have illustrated an arrangement in which the principles of my invention are utilized to produce a pressure which varies as the logarithm of a variable condition, it should be readily apparent that these principles may be used to produce a pressure varying as any desired trigonometric, exponential or other function of a variable condition.

While I have shown and described a preferred embodiment of my invention, other modifications thereof will readily occur to those skilled in the art, and I therefore intend my invention to be limited only by the appended claims.

I claim as my invention:

1. Apparatus for measuring the ratio between first and second variable pressures, comprising an exhibiting member, means for positioning said member in accordance with the difference between third and fourth pressures, a scale adjacent said member for reading the antilogarithm of said difference and a pair of means for varying said third and fourth pressures, respectively, as the logarithm of said first and second pressures so that the antilogarithm of said difference is a measure of the ratio of said conditions, each of said pair of pressure varying means including a pair of chambers, a connection between the lower portions of said chambers, a tube extending upwardly from one of said chambers and having a cross-sectional area relatively small as compared to that of said one chamber, a first fluid filling said chambers to a point substantially above said connection, a second fluid of lower density than said first fluid and nonmiscible therewith filling said one chamber above the level of said first fluid and extending upwardly into said tube, said one chamber having an effective cross-sectional area varying with its depth so that the volume of said second fluid displaced from said one chamber varies as a logarithmic function of the level of said first fluid therein, means for subjecting the surface of said first fluid in the other of said chambers to one of said first and second variable pressures and hence varying the pressure at the base of said tube in accordance with the logarithm of said one pressure, and means for communicating the pressure at the base of the tube in each of said pressure varying means to said member positioning means.

2. Apparatus for measuring the ratio between first and second variable conditions, comprising an exhibiting member, means for positioning said member in accordance with the difference between first and second pressures, a scale adjacent said member for reading the antilogarithm of said difference, a pair of means for varying said first and second pressures, respectively, as the logarithm of said first and second conditions so that the antilogarithm of said difference is a measure of the ratio of said conditions, and means for communicating said first and second pressures from said pair of pressure varying means to said member positioning means.

3. Apparatus for measuring the ratio between first and second variable pressures, comprising an exhibiting member, means including a pair of opposed pressure responsive devices for positioning said member in accordance with the difference between third and fourth pressures to which said devices are respectively responsive, a scale adjacent said member for reading the antilogarithm of said difference, a pair of means for varying said third and fourth pressures, respectively, as the logarithm of said first and second pressures so that the antilogarithm of said difference is a measure of the ratio of said first and second pressures, each of said pressure varying means including first and second chambers, a connection between the lower portions of said chambers, a tube extending upwardly from said first chamber and having a cross-sectional area relatively small as compared to that of said first chamber, a first fluid filling said chambers to a point substantially above said connection, a second fluid of lower density than said first fluid and nonmiscible therewith filling said first chamber above the level of said first fluid and extending upwardly into said tube, at least one of said chambers having an effective cross-sectional area varying with its depth so that the volume of said second fluid displaced from said first chamber varies as a logarithmic function of the level of said first fluid therein, means for subjecting the surface of said first fluid in said second chamber to one of said first and second variable pressures and hence varying the pressure at the base of said tube in accordance with the logarithm of said one pressure, and means for communicating the pressure at the base of the tube in each of said pressure varying means to one of said pressure responsive devices.

4. Apparatus for measuring the ratio between first and second variable pressures, comprising an exhibiting member, means including a pair of opposed pressure responsive devices for positioning said member in accordance with the difference between third and fourth pressures to which said devices are respectively responsive, a scale adjacent said member for reading the antilogarithm of said difference, a pair of means for varying said third and fourth pressures, respectively, as the logarithm of said first and second pressures so that the antilogarithm of said difference is a measure of the ratio of said first and second pressures, each of said pressure varying means including first and second chambers, a connection between the lower portions of said chambers, a third chamber of elongated form extending upwardly from said first chamber and having a cross-sectional area relatively small as compared to that of said first chamber, a first fluid filling said first and second chambers to a point substantially above said connection, a second fluid of lower density than said first fluid and nonmiscible therewith filling said first chamber above the level of said first fluid and extending upwardly into said third chamber, at least one of said chambers having an effective cross-sectional area varying with its depth so that the level of said second fluid in said third chamber varies as a logarithmic function of the level of said first fluid in said second chamber, means for subjecting the surface of said first fluid in said second chamber to one of said first and second variable pressures and hence varying the pressure at the base of said third chamber in accordance with the logarithm of said one pressure, and means for communicating the pressure at the base of the third chamber in each of said pressure varying means to one of said pressure responsive devices.

5. Apparatus for measuring the ratio between first and second variable conditions, comprising a movable member having a normal position, means including a pair of opposed pressure responsive devices for displacing said member from said position by an amount dependent upon the difference between first and second pressures to which said devices are respectively responsive, means associated with said member for exhibiting, for each value of displacement of said member, the value of a function varying as the antilogarithm of said displacement, and a pair of means for varying said first and second pressures, respectively, as the logarithm of said first and second conditions so that the antilogarithm of said difference is a measure of the ratio of said conditions.

6. Apparatus for measuring the ratio between first and second variable conditions, comprising means responsive to said first condition for producing a first pressure varying as the logarithm of said first condition, means responsive to said second condition for producing a second pressure varying as the logarithm of said second condition, and means subject to said first and second pressures for measuring the difference between them.

LEIGHTON LEE, II.

REFERENCES CITED

The following references are of record in the file of this patent:

UNITED STATES PATENTS

| Number | Name | Date |
| --- | --- | --- |
| 1,481,952 | Bacharach | Jan. 29, 1924 |
| 1,257,965 | Bailey | Mar. 5, 1918 |
| 1,592,415 | Bristol | July 13, 1926 |
| 1,573,850 | Naiman | Feb. 23, 1926 |
| 2,342,587 | Klemperer | Feb. 22, 1944 |

FOREIGN PATENTS

| Number | Country | Date |
| --- | --- | --- |
| 266,705 | Great Britain | June 9, 1927 |
| 504,285 | Great Britain | 1939 |